US008619909B2

(12) United States Patent
McGehee

(10) Patent No.: US 8,619,909 B2
(45) Date of Patent: Dec. 31, 2013

(54) SIGNAL DETECTOR USING MATCHED FILTER FOR TRAINING SIGNAL DETECTION

(75) Inventor: Jared McGehee, Boerne, TX (US)

(73) Assignee: Southwest Research Institute, San Antonio, TX (US)

( * ) Notice: Subject to any disclaimer, the term of this patent is extended or adjusted under 35 U.S.C. 154(b) by 1492 days.

(21) Appl. No.: 11/765,867

(22) Filed: Jun. 20, 2007

(65) Prior Publication Data

US 2007/0297541 A1 Dec. 27, 2007

Related U.S. Application Data

(60) Provisional application No. 60/805,276, filed on Jun. 20, 2006.

(51) Int. Cl.
*H03K 9/00* (2006.01)
*H04L 27/00* (2006.01)

(52) U.S. Cl.
USPC ........................... 375/316; 375/323; 375/324

(58) Field of Classification Search
USPC .......................... 375/316, 323, 324
See application file for complete search history.

(56) References Cited

U.S. PATENT DOCUMENTS

| 5,940,778 | A * | 8/1999 | Marfurt et al. ................. 702/16 |
| 5,974,094 | A * | 10/1999 | Fines et al. ..................... 375/335 |
| 6,393,077 | B1 | 5/2002 | Usui .............................. 375/343 |
| 6,556,674 | B1 | 4/2003 | Li et al. .......................... 379/386 |
| 6,690,746 | B1 | 2/2004 | Sills et al. ...................... 375/316 |
| 6,760,366 | B1 | 7/2004 | Wheatley, III et al. ....... 375/152 |
| 6,834,078 | B1 | 12/2004 | Niemela et al. ............... 375/224 |
| 2001/0036221 | A1* | 11/2001 | Sato ............................... 375/147 |
| 2003/0161388 | A1 | 8/2003 | Schilling ........................ 375/147 |
| 2004/0184399 | A1* | 9/2004 | Chiou ............................. 370/206 |
| 2004/0190663 | A1* | 9/2004 | Carsello et al. ............... 375/354 |
| 2005/0032479 | A1* | 2/2005 | Miller et al. ............... 455/67.11 |
| 2005/0220229 | A1 | 10/2005 | Goto .............................. 375/343 |

\* cited by examiner

*Primary Examiner* — Chieh M Fan
*Assistant Examiner* — Freshteh N Aghdam
(74) *Attorney, Agent, or Firm* — Chowdhury & Georgakis P.C.; Ann C. Livingston

(57) ABSTRACT

A method of detecting whether an incoming signal is a signal type of interest having a known training sequence. The signal is filtered with a matched filter as in conventional methods. However, the filter processing is performed in a unique manner that maximizes computational efficiency.

11 Claims, 1 Drawing Sheet

SIGNAL DETECTOR USING MATCHED FILTER FOR TRAINING SIGNAL DETECTION

RELATED PATENT APPLICATION

This application claims the benefit of U.S. Provisional Application No. 60/805,276, filed Jun. 20, 2006 and entitled "SIGNAL DETECTOR USING MATCHED FILTER FOR TRAINING SIGNAL DETECTION."

TECHNICAL FIELD OF THE INVENTION

This invention relates to signal processing, and more particularly to signal detection by using a filter matched to a training sequence of a signal of interest.

BACKGROUND OF THE INVENTION

"Blind" signal detection generally involves receiving and decoding incoming signals when the signal type is not known to the receiver. Many fields of science deal with this type of signal detection, and various techniques have been developed to identify an incoming signal of unknown type, so that its parameters, such as the modulation type and baud rate, can be known and used to decode the signal.

Several examples of signal recognition techniques are parameter-based algorithms, pattern recognition, algorithms that exploit cyclostationarity characteristics, and neural networks. U.S. Pat. No. 6,690,746, entitled "Signal Recognizer for Communications Signals", assigned to Southwest Research Institute, discusses a system and method for classifying incoming signals as being one of a variety of signal types. Signal parameters are estimated and signals are demodulated in accordance with the estimated parameters.

A subfield of signal recognition includes methods that attempt to decode (or otherwise use) only signals of a desired type. For example, a signal of interest might be a signal that carries a particular training sequence.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

For purposes of this description, "signal detection" is the process by which an unknown signal is classified as a signal of interest or not. The method and system described herein are for "blind channel" conditions, in the sense that the receiving end of the system (referred to herein as the "signal detector") has no knowledge of the transmitted signal's path, its frequency, the type of signal, or the signal parameters.

As explained below, the object of the method and system is to detect whether an incoming signal has a particular training sequence. Because a training sequence is unique to a particular type of signal, if the training sequence is identified, then the signal type and hence its signal parameters are assumed to be known. The message in the signal can then be decoded.

A feature of the invention is that it provides for a computationally efficient search for the training sequence. The method is robust in the presence of unknown carrier frequency offset values and channel distortion.

A "training sequence" is a part of a signal that is a known sequence of transmitted symbols. The training sequence does not contain any "message" information, but rather is used for equalization processing. Specifically, the training sequence enables the receiver to gather information about the channel characteristics. Typically, a particular type of signal has its own unique training sequence. If a signal complies with a standard, the training sequence is part of that standard. For example, for a GSM signal, which arrives in bursts of 126 bits, 26 bits are reserved for a training sequence.

A training sequence is typically associated with a digital signal, but can be used with analog signals. In general, the invention described herein can be used with any signal having a training sequence.

For an incoming signal containing a training sequence, a matched filter provides an optimum detection strategy. In general, in communications systems, "filters" are used to remove or attenuate an undesired portion of signal's spectrum while enhancing desired portions of the signal. Filters may be analog or digital, with the later being used in connection with processing devices to process a signal after it has been sampled and digitized. A "matched filter" is the filter design for a particular signal that maximizes the signal to noise ratio at the output of the filter.

For detecting a training sequence, the matched filter is designed to find a match to the training sequence of the signal of interest. As explained below, the filter is designed as the conjugated training sequence t. The values of the convolution of the matched filter with the input signal can be tested against a suitably chosen threshold to make the detection decision. If the correlation is high, the signal is determined to be a signal of interest.

Figure 1:
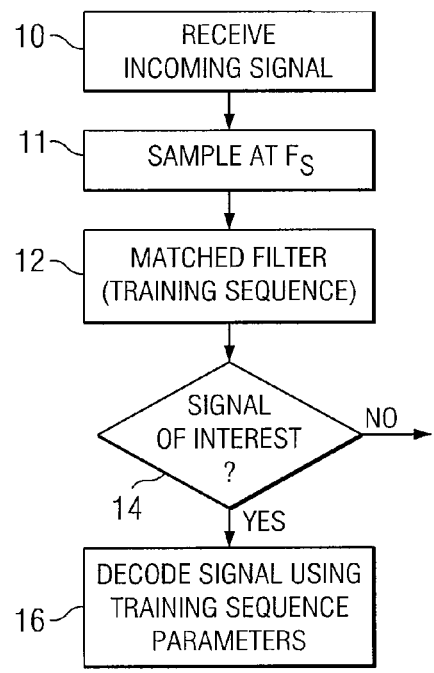
FIG. 1 illustrates a method of identifying a signal by identifying its training sequence in accordance with the invention.

FIG. 1 illustrates a method of signal recognition in accordance with the invention. The steps of the method, particularly the processing of Steps 11-16 can be implemented with conventional processing equipment, programmed in accordance with the method described herein.

Step 10 is receiving an incoming signal of an unknown type. Step 11 is sampling the signal at a sampling frequency, $F_s$, which is the same as the sample frequency assumed for the filter calculations described below. It the signal is already digital, it is resampled at $F_s$.

Noteably, the signal is not mixed with different frequencies prior to application of the matched filter processing in Step 12. As explained below, a feature of the invention is the re-ordering of processing steps for computation efficiency. The "mixing" is performed within the filter processing rather than before the filter processing.

Step 12 is processing the data through a filter that is matched to a known training signal, and is described in further detail below. Step 14 is determining whether the signal training signal is matched to the filter. If so, the signal is assumed to be a signal of interest, in Step 16, the message portion of the signal may be decoded using the training sequence.

The use of a matched filter for detecting a training sequence may be described in mathematical terms. Specifically, in matrix-vector notation, matched filtering can be expressed as:

$N \equiv$ Length of Training Sequence $\underline{t} \equiv$ Training Sequence Vector $Q \equiv$ Length of Input Signal $\underline{x}[n] \equiv$ Input Signal Vector Over Sample Indices $[n, n+N-1]$ $\alpha \equiv$ Minimum Confidence Threshold in Range $(0, 1]$ $\mu \equiv$ Detection Threshold $\quad = \alpha^2 \|\underline{t}\| \|\underline{x}[n]\|$ $\quad = \alpha^2 (\underline{t}^H \cdot \underline{t})(\underline{x}^H[n] \cdot \underline{x}[n])$ $y[n] \equiv$ Matched Filter Output at Sample Index $n$ $\quad = \underline{t}^H \cdot \underline{x}[n]$ The number of multiplications required to evaluate y[n] for all possible n can be expressed as:

$Q(1+3 \cdot \log_2 Q), Q > N, Q = 2^k$ in the most efficient implementation.

Figure 2:
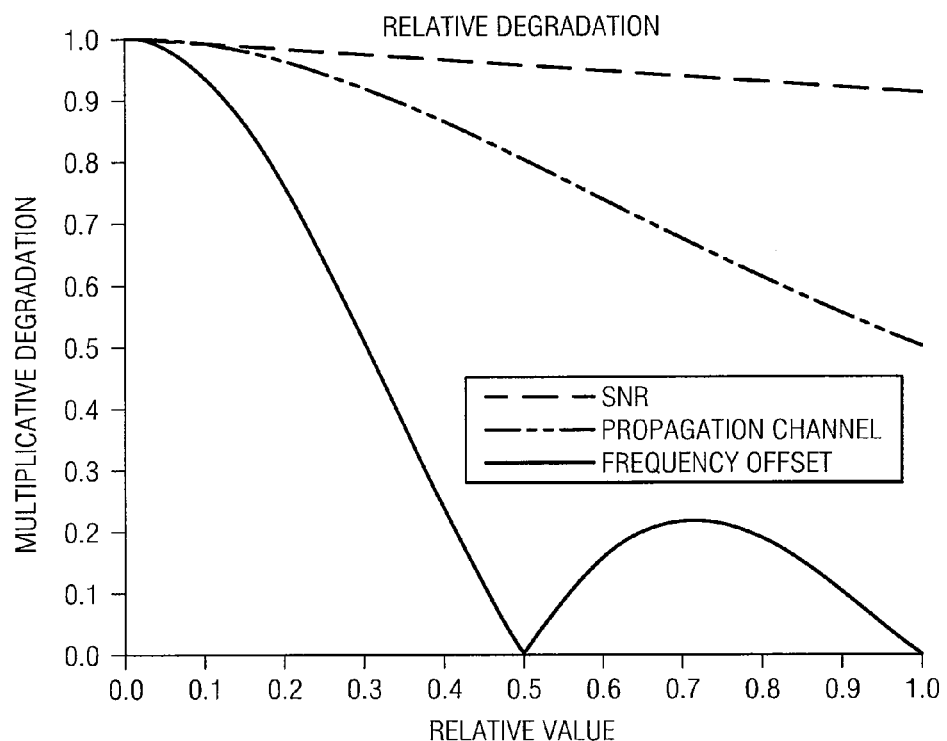
FIG. 2 illustrates the relative degradation caused by various conditions affecting an incoming signal.

If y[n] exceeds μ at any index, the training sequence has been detected. Under perfect conditions and in the absence of noise, a confidence threshold of 1 may be chosen. In practice, however, the confidence is degraded by the signal to noise ratio (SNR), channel propagation filter h, and carrier or doppler frequency offset f. The perfect confidence is multiplicatively degraded by:

$$\frac{1}{1+SNR} \cdot \frac{h^2[0]}{\underline{h}^H \cdot \underline{h}} \cdot \left| \frac{\sin(\omega)}{\omega} \right|$$

where:

$\omega = \frac{2\pi N}{M}$ $M = \frac{F_s}{f}$ $F_s \equiv$ Sampling Frequency in Hz As illustrated in FIG. 2, it is the third degradation term (due to frequency offset) that has the greatest effect. The x-axis units have been normalized relative to each other.

There is nothing that can be done at the receiver to change the SNR or propagation channel conditions. However, in conventional matched filter methods, mixing the input signal with M different frequencies prior to performing the matched filter search has been used to reduce degradation due to unknown carrier offset. M is chosen to set the worst-case degradation to a manageable value (no lower than 0.9). This greatly increases the number of required complex multiplications to:

$M \cdot Q(1 + 3 \cdot \log_2 Q)$

The conventional filtering method, with mixing, can be expressed as follows:

$y_m[n] \equiv$ Matched Filter Output at Sample Index $n$, Frequency Offset $f_m$ $\quad = \underline{t}^H \cdot E_m \cdot \underline{x}[n]$ $E_m \equiv$ Mixing Matrix $\quad = \text{diag}(e^{j2\pi f_m n})$ $f_m = m \cdot \frac{F_s}{M}$ A feature of the method of FIG. 1 (Step 12) is that by rearranging the order of operations, the matched filter output is performed as the (fast) Fourier transform of the dot product of the conjugated training sequence and the input signal. In this method, $y_m[n]$ is the matched filter output at sample index n and frequency offset $f_m$.

$y_m[n] = \text{FFT}(\underline{t}^* \cdot \underline{x}[n])$

The method of FIG. 1 has computational complexity:

$N \cdot Q(1 + \log_2 N)$ and a decrease in complex multiplications by a factor of:

$$\frac{M \cdot (1 + 3\log_2 Q)}{N \cdot (1 + \log_2 N)}$$

This is always a decrease because both M and Q are required to be greater than N.

To understand the reduced computational complexity of the improved method of FIG. 1, consider the following practical example:

N=128
$F_s$=8000
M=512
Q=512

The number of complex multiplies of the traditional method is 7,340,032. The number of complex multiplies of the improved, efficient method is 524,288.

There is one further innovation that should be mentioned. Each $y_m[n]$ comprises one column of a two-dimensional time-frequency image of size (M×Q). This necessitates a two-dimensional peak search against the threshold. Once a peak is detected, computing the 2-D expected value around the peak provides precise estimates of the carrier frequency and symbol timing clock offsets. Considering the example values provided above, the accuracy is typically less than 1 Hz and 1 sample, respectively.

In other words, the output of the matched filter (Step 12) provides at least four signal parameters. The correlation has a position in time and a position in frequency, as well as a value. The correlation value and position can be used to determine the following parameters: the start time of the training sequence (which indicates the symbol timing clock offset), the carrier frequency, the carrier offset, and the signal to noise ratio.

Figure 3:
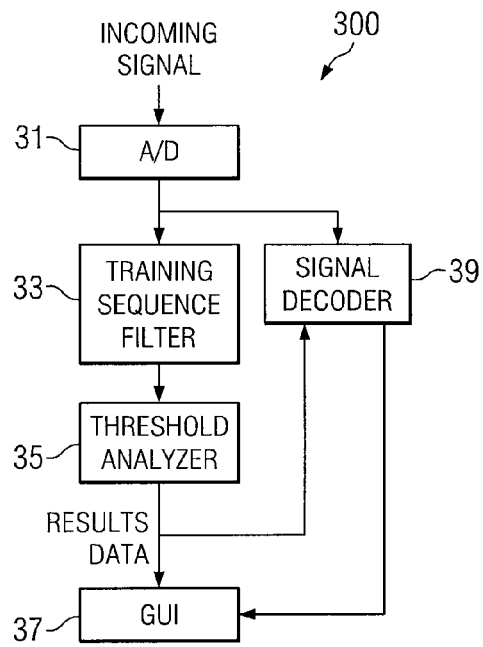
FIG. 3 illustrates a signal detection system in accordance with the invention.

FIG. 3 illustrates a signal detection system 300, designed to detect a signal having a particular training sequence. System 300 is an example of an application of signal detection for the purpose of decoding the signal. Other applications are possible.

System 300 may be part of a larger system, having different "modules" each associated with recognizing a different type of signal. For example, a system 300 may be a module of a larger system which has additional modules like system 300 but for signals having different training sequences. A larger system might also process an incoming signal prior to the signal being processed by system 300, such as a system that first determines if the incoming signal is of a type that uses a training sequence. If so, the signal would be directed to one or more modules like system 300, and if not, the signal could be deemed not of interest or it could be directed to some other type of recognition module.

As described above, the incoming signal is sampled (or resampled) by an A/D converter 31. It is then processed by the training sequence filter 33, which is designed to detect a particular training sequence of interest. The process performed by filter 33 is that of Step 12 in the method of FIG. 2 discussed above. The results of the filter 33, typically a correlation value, are delivered to a confidence analyzer 35, which uses the filter results to determine whether the signal is likely to be the signal of interest. Data from the confidence analyzer may also be delivered to a graphical user interface (GUI) 37, for interaction with an operator. If the signal is determined to be the signal of interest, it may be routed to a decoder 39, which uses signal parameters associated with that type of signal to decode the "message" portion of the signal.

What is claimed is:

1. A method of detecting whether an incoming signal is a signal type of interest having a known training sequence, comprising:
   receiving an input signal of an unknown type, such that any carrier frequency offset is unknown;
   sampling the input signal at a known sampling frequency;
   filtering the input signal, using digital filter processing, by performing the following steps: calculating the conjugate of the training sequence, calculating the dot product of the conjugated training sequence and the input signal, and calculating the fast Fourier transform of the dot product;
   wherein the carrier frequency offset remains unknown prior to filtering the input signal and the filtering step is performed without prior mixing of the input signal;
   repeating the filtering step over an index of n iterations, where n is a sample index, thereby obtaining a series of filter outputs that are columns of a two-dimensional time-frequency matrix; and
   performing a two-dimensional search of the filter outputs against a detection threshold value, thereby obtaining a correlation value having a position in time and a position in frequency;
   using the results of the preceding step to obtain one or more of the following parameters of the input signal: start time of the training sequence, carrier frequency, and carrier offset.

2. The method of claim 1, wherein the signal is a GSM signal.

3. The method of claim 1, wherein the signal is an analog signal.

4. The method of claim 1, wherein the signal is a digital signal.

5. The method of claim 1, wherein the results of the two-dimensional search are further used to determine signal to noise ratio.

6. The method of claim 1, further comprising the step of using the parameters to decode the incoming signal.

7. A blind signal detection system for detecting whether an incoming signal is a signal type of interest having a known training sequence, comprising:
   an analog to digital converter for receiving the signal and for sampling the signal at a known sampling frequency;
   wherein the signal is of an unknown type, such that any carrier frequency offset is unknown;
   a digital filter for filtering the signal, using digital filter processing, by performing the following steps: calculating the conjugate of the training sequence, calculating the dot product of the conjugated training sequence and the input signal, calculating the fast Fourier transform of the dot product, and repeating the filtering step over an index of n iterations, where n is a sample index, thereby obtaining a series of filter outputs that are columns of a two-dimensional time-frequency matrix;
   wherein the digital filter performs the digital filter processing without a known value of the carrier frequency offset and without any mixing of the input signal prior to the digital filter processing;
   and an analyzer for analyzing the filter output to determine whether the incoming signal is of the signal type of interest;
   wherein the analyzer is programmed to perform a two-dimensional search of the filter outputs against a detection threshold value, thereby obtaining a correlation value having a position in time and a position in frequency, and to obtain one or more of the following parameters of the input signal: start time of the training sequence, carrier frequency, and carrier offset.

8. The system of claim 7, wherein the incoming signal is a GSM signal.

9. The system of claim 7, wherein the incoming signal is an analog signal.

10. The system of claim 7, wherein the incoming signal is a digital signal.

11. The system of claim 7, further comprising the step of using the parameters to decode the incoming signal.

\* \* \* \* \*